(12) United States Patent
Tan et al.

(10) Patent No.: US 11,556,398 B2
(45) Date of Patent: Jan. 17, 2023

(54) CENTRALIZED DATA MANAGEMENT

(71) Applicant: Bay Systems Consulting, Inc., E. Palo Alto, CA (US)

(72) Inventors: Lujie Tan, Moffett Field, CA (US); Sandeep Shetye, Moffett Field, CA (US); Cuong Nguyen, Moffett Field, CA (US); Ronald Instrella, Moffett Field, CA (US); Jamie Vigliotta, Moffett Field, CA (US); Mohana Gurram, Moffett Field, CA (US); Jairon Moh-Hashim Camarillo, Moffett Field, CA (US)

(*) Notice: Subject to any disclaimer, the term of this patent is extended or adjusted under 35 U.S.C. 154(b) by 0 days.

(21) Appl. No.: 17/081,947

(22) Filed: Oct. 27, 2020

(65) Prior Publication Data

US 2022/0129330 A1 Apr. 28, 2022

(51) Int. Cl.
| | |
|---|---|
| G06F 3/00 | (2006.01) |
| G06F 9/54 | (2006.01) |
| G06F 16/22 | (2019.01) |
| G06F 16/25 | (2019.01) |

(52) U.S. Cl.
CPC ............ G06F 9/54 (2013.01); G06F 16/22 (2019.01); G06F 16/258 (2019.01)

(58) Field of Classification Search
CPC ....................................... G06F 9/541
USPC ........................................... 719/328
See application file for complete search history.

(56) References Cited

U.S. PATENT DOCUMENTS

| | | | | |
|---|---|---|---|---|
| 10,015,167 | B1* | 7/2018 | O'Kennedy | G06F 9/54 |
| 2014/0211665 | A1* | 7/2014 | Voccio | H04L 12/1403 370/259 |
| 2015/0067176 | A1* | 3/2015 | Dubois | H04L 65/1073 709/227 |
| 2017/0200240 | A1* | 7/2017 | Marinelli | H04L 41/22 |
| 2017/0286929 | A1* | 10/2017 | Bodman | G06Q 40/02 |
| 2018/0278705 | A1* | 9/2018 | Wagenknecht | H04L 67/56 |

(Continued)

FOREIGN PATENT DOCUMENTS

| | | | | |
|---|---|---|---|---|
| CN | 111818035 A | * | 10/2020 | |
| CN | 111095239 B | * | 2/2022 | G06F 16/29 |

OTHER PUBLICATIONS

J T Zhao, S Y Jing, Management of API Gateway Based on Micro-service Architecture. (Year: 2018).*

(Continued)

*Primary Examiner* — Lechi Truong
(74) *Attorney, Agent, or Firm* — Nwamu, PC (57) ABSTRACT

A data management platform for managing interconnected data and its derivatives is disclosed. For one example of the present disclosure, the data management platform receives data assets to a data management platform through an API gateway. The data assets are reformatted based upon a corresponding data model. A set of data management features are accessed through a corresponding API. The set of data management modules includes tagging, ownership, relationship, cataloging, discovery, lineage and provenance, and lifecycle. The management modules provide dynamic identification of interconnections between the data assets. Interconnections for the data assets are generated and the data assets and the interconnection data are stored based upon a format of the data.

16 Claims, 4 Drawing Sheets

(56) References Cited

U.S. PATENT DOCUMENTS

2021/0117251 A1\* 4/2021 Cristofi .............. H04L 63/1433

OTHER PUBLICATIONS

David Bernstein, Intercloud Federation using via Semantic Resource Federation API and Dynamic SDN Provisioning. (Year: 2014).\*

\* cited by examiner

CENTRALIZED DATA MANAGEMENT

STATEMENT REGARDING FEDERALLY SPONSORED RESEARCH OR DEVELOPMENT

This disclosure was made with Government support under contract number NNA14AA60C awarded by NASA. The Government has certain rights in the invention.

BACKGROUND

Examples of the present disclosure relate, generally to data science, and more specifically to systems and methods for the storage, retrieval, and management of data, including metadata, interconnected data, and data derivatives. Many organizations have data stored in differing formats and various locations throughout the organization and often outside the organization. It is often difficult to access such data and to determine and access interconnected data and data derivatives. Conventional schemes employ data warehousing to integrate data from multiple sources for analysis or querying. Data warehousing typically uses full-text search and analytics techniques which have an inherent disadvantage of reduced relevancy. Data warehousing does not effectively manage the interconnections between data and metadata at multiple levels nor with disparate hierarchical or graphical structures, for example.

BRIEF DESCRIPTION OF THE DRAWINGS

Advantages and features of the disclosure will be rendered by reference to specific examples thereof which are illustrated in the appended drawings. The drawings illustrate only particular examples of the disclosure and therefore are not to be considered to be limiting of its scope. The principles herein are described and explained with additional specificity and detail through the use of the accompanying drawings in which.

DETAILED DESCRIPTION

A data management platform for managing interconnected data and its derivatives is disclosed. For one example of the present disclosure, the data management platform is made up of multiple data management and integration modules (modules) that identify and manage interconnections between data and metadata at multiple levels and communicate with a user application through an application program interface (API) gateway. The data management and integration modules of the data management platform also communicate with each other through the API gateway.

For one example of the present disclosure, a data management platform is comprised of multiple modules which may be implemented as a microservices architecture having a set of independently deployable processes. Microservices architecture provides a service-oriented software design architecture in which a software application is composed of multiple processes (services) that are independently deployable. This improves modularity and facilitates a continuous delivery and deployment software development process as a change to a portion of the application only requires rebuilding and redeploying the affected services. For one example of the present disclosure, a data management platform uses microservice architecture to provide efficient access to independent modules with each module providing one or more functional capabilities (features). Together the modules provide data management including tagging, ownership, relationship, cataloging, discovery, lineage and provenance, and lifecycle. Such data management can integrate heterogeneous datasets, facilitating cross-domain metadata management, identifying and limiting unconnected data sources and other fragmented data, as well as reducing redundant data sources. Thus, examples of the present disclosure provide improved data management and allow real-time analysis of unstructured datasets.

Reference will now be made in detail to the examples of the disclosure, which are illustrated in the accompanying drawings. While the disclosure will be described in conjunction with the examples, it will be understood that the examples are not intended to limit the disclosure to these examples. On the contrary, the disclosure is intended to cover alternatives, modifications and equivalents which may be included within the spirit and scope of the disclosure as defined by the appended claims. Furthermore, in the following detailed description of the present disclosure, numerous specific details are set forth to provide a thorough understanding of the present disclosure. However, it will be obvious to one of ordinary skill in the art that the present disclosure may be practiced without these specific details. In other instances, well-known methods, procedures, components, and circuits have not been described in detail as to not unnecessarily obscure aspects of the present disclosure.

Moreover, inventive aspects lie in less than all features of a single disclosed example. Thus, the appended claims following the Detailed Description are hereby expressly incorporated into this Detailed Description, with each claim standing on its own as a separate example of this invention.

Figure 1:
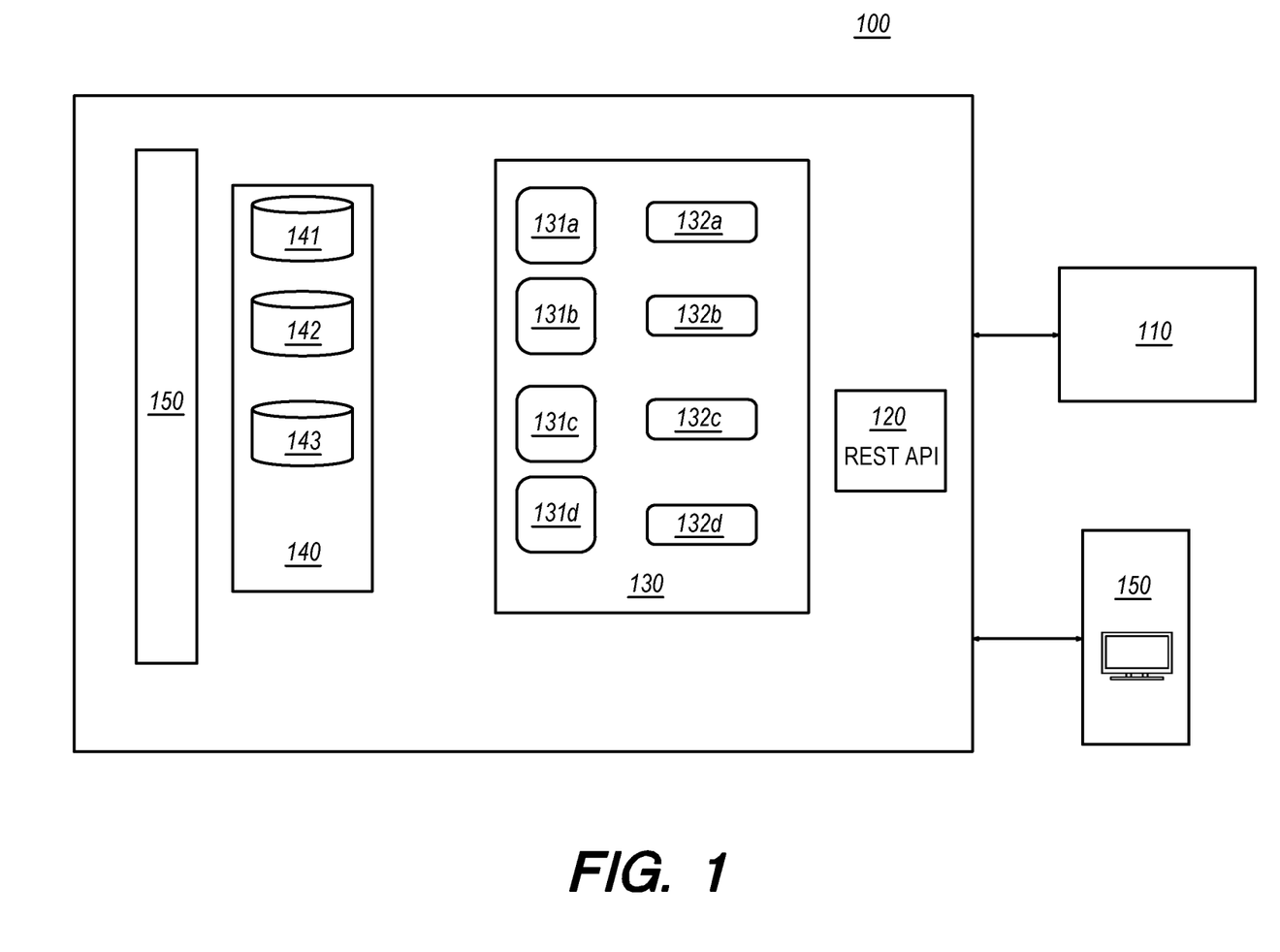
FIG. 1 illustrates a data management and integration system according to an example of the present disclosure.

FIG. 1 illustrates a data management and integration system (data management platform) according to an example of the present disclosure. System 100, shown in FIG. 1, includes a source of miscellaneous data assets 110 representing data assets from multiple disparate sources and in various data formats. For example, the data may be a Microsoft Word document, or a Microsoft Excel document or may be in an organization-specific format, or many other possible formats. For example, some organizations have specialized data and specialized data types and/or interact with other organization having organization-specific data formats. Typically, portions of the data are controlled by various organizations and in various locations. Examples of the disclosure provide the user with the ability to centralize miscellaneous data from multiple sources for data management and analysis.

The miscellaneous data asset source component 110 interacts with the data management and integration modules component 130 through an API gateway 120. The API gateway 120 may employ the representation state transfer architecture and is shown, for example, as a REST API. The API gateway 120 performs the processes of data extraction, data transformation, and data loading (ETL process) to copy the data from the disparate data sources to the data management platform. End-user applications and services use the API gateway 120 to interact with the data management and integration modules.

According to an example of the present disclosure a separate module is employed to perform each of the ETL processes. The data management and integration modules component 130 include several data management and integration modules, shown for example as modules 131a-131d. Each module 131a-131d has a corresponding API gateway, shown for example as API gateways 132a-132d. Each of the modules 131a-131d use the corresponding API gateways 132a-132d to communicate with one another through the API gateway 120.

The API gateway 120 gateway also serves as a conduit for services to interact with each other. Each service is modularized, utilizing a separate Docker orchestrator instance to run its core functionalities. This adheres to a containerized approach for each functional capability and gives users the flexibility to update technologies in each service as they evolve, without impacting the API gateway. Thus, every connected application and service that use this gateway is agnostic to upgrades. Thus, for some examples, the data management platform routes its microservices through a central HTTP module for efficient integration with various domain-specific applications. Each service is connected to the HTTP module through the integration of business logic and provides single-point access to the data management modularized features through the APIs. This allows the data management platform to handle multiple domain-specific applications.

The data management modules component 130 may include many types of data management and integration modules which may be implemented using microservices architecture. The modules provide data management that may include a Tag Management Services (TMS) module, an Access Control List (ACL) module, a Link Management System (LMS) module, and Metadata Management Services (MMS) module, among others. The modules use microservices to interact with one another. These exemplary modules provide specific data management features as discussed more fully below.

The data received from the data asset source component 110 is reformatted into a new data model (e.g., schema) for management, organization, and classification. There is a data model for each data type and the data is reformatted based upon the corresponding data schema. For example, the received data may be graphical data and may be reformatted in a data format that is suitable for the storage of graphical data or, for example, the received data may include data tables that may be more accessible if stored in columns rather than rows. Thus, the graphical data may be reformatted for storage in a distributed graph database and the data tables may be reformatted for storage in a distributed columnar database. Likewise, the received data may be less structured and therefore may be reformatted in a data format for document-oriented storage and may then be stored in a distributed document-oriented database.

The reformatted data may then be saved in host storage 140 based upon the data schema and user direction. The host storage 140 is comprised of one or more servers. Each server is modularized and may use a separate container orchestrator to run core functionalities thus allowing the data management features to be modified without impacting the API gateway. Each of the servers of the host storage 140 may include multiple containerized databases/database management systems, shown for example as containerized databases 141-143. The containers for the containerized databases use microservices to communicate with each other. The containers may be, for example, Docker containers and the databases/database management systems may include, for example, NEO4J, MongoDB, and Cassandra, among others.

System 100 also includes one or more user access devices, shown, for example as user access device 150 through which a user accesses the data, including related metadata, interconnected, data and data derivatives in a desired format. A user access device may be any suitable computing device, including but not limited to a desktop computing device, a laptop computing device, or a tablet computing device, among others. A user access device may provide a user interface which may be, for example, an application-specific GUI, a mobile application, a web browser, a domain-specific web application, or other type of hardware or software devices providing user access to the data-management platform.

Exemplary Data Management

As discussed above, a data management platform in accordance with some examples of the present disclosure, provides a set of data management services (or features). Examples of the present disclosure provide the following data management services, among others.

Data Tagging:

Examples of the present disclosure allow a user to assign keywords (e.g., meta tags) to data records so that disparate data from multiple heterogenous data systems may be more efficiently organized. Using the data tagging feature, provided by the Tag Management Services module, users can assign, store, retrieve, query, and perform analytics on tagged data. This feature allows the development of applications that map new data to tags and notify users of possible associations.

Data Ownership:

Examples of the present disclosure provide data security through a data ownership service, provided by the ACL module, that allows the user to manage authorizations across its microservices. For one embodiment, the data ownership feature follows the principles of Role Based Access Control (RBAC) and employs the foundational elements of users, groups permissions, roles, and domains. Users are single system operators having a unique identifier; groups are sets of users; permissions are controlled functions that can be performed on a data asset; roles are sets of permissions; and domains are identifiers that separate datasets between various applications.

Data Relationships:

Examples of the present disclosure provide a data relationship service that dynamically associates data assets based on their content. The data relationship service is provided by the LMS module. For some examples, the LMS module may include a link metadata module to capture metadata associated with data asset relationships. Such metadata may include, for example, data source types, attributes, and system flags. For some examples, the LMS module may also include a link network module to capture the links that connect data assets.

Data and Metadata Cataloging:

Examples of the present disclosure provide a data and metadata cataloging service through the MMS module. For some examples, the MMS module comprises several modules each of which addresses a different type of metadata. For one example, the MMS module comprises separate modules to address technical, business, and operations metadata. For example, a context module handles sets of semi-structured technical metadata, a state logic module tracks multilevel associations and structured parent-child relationships between data assets, and a lifecycle module tracks data modifications.

Data Discovery:

Examples of the present disclosure provide a data discovery service implemented as a set of interfaces to search data across domains ingested from various data sources. The data discovery service may be integrated with some of the other features discussed herein (e.g., data relationships, data ownership, data tagging and metadata cataloging) to enable smart data discovery, thereby promoting data democratization. The data discovery service may forms of artificial intelligence (e.g., machine learning) to enhance data discovery, allowing users to easily find and tag similar records.

Data Lifecycle:

Examples of the present disclosure provide a data lifecycle service to facilitate data lifecycle management including data collection, data maintenance, and data synthesis. The data lifecycle service may conduct lifecycle tracking of data assets by tagging snapshots of data at various relevant points in the data lifecycle. For example, in the case of product data, the data lifecycle feature may tag snapshots at different stages of a product's lifecycle. As data evolves over the product lifecycle, snapshots from previously tagged stages can be searched and retrieved. Various versions of a data asset can be mapped to different stages of the product lifecycle.

Data Lineage and Provenance:

Examples of the present disclosure provide a data lineage and provenance: service to facilitate error detection and origin and promote interoperability. The data platform may use this feature to track a data asset's origin while honoring the authoritative system record identifiers. The data lineage and provenance feature may also track a data asset's revision history, including information about who made changes, when changes were made, and if changes are linked to other data assets. Cloned or copied data assets can be traced back to source data assets. The data lineage and provenance feature may simplify and improve the ability to trace errors in a data analytics process back to their root cause.

Figure 2:
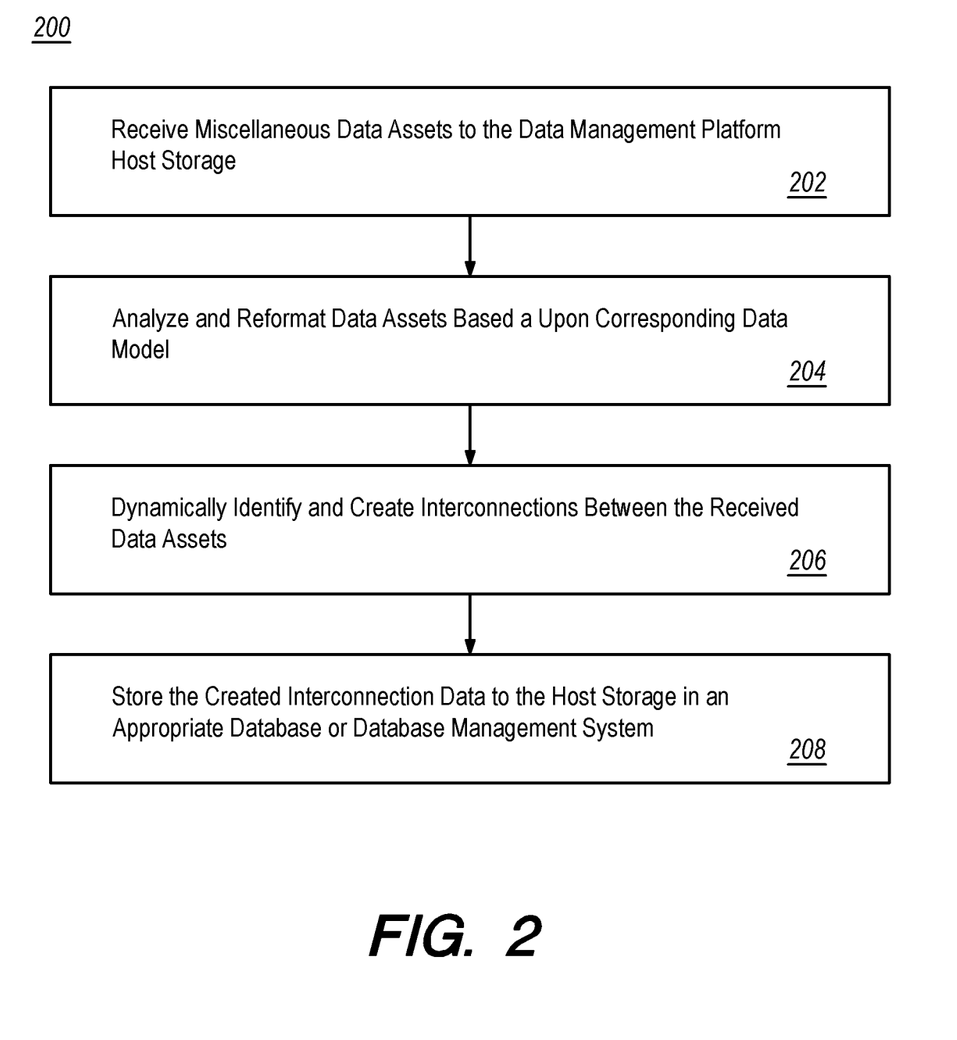
FIG. 2 illustrates a process by which data from multiple sources with various formats is centralized to a data management platform according to an example of the present disclosure.

FIG. 2 illustrates a process by which data assets are received from multiple sources with various formats is centralized to a data management platform in accordance with an example of the present disclosure. Process 200, shown in FIG. 2 begins with operation 202 in which data assets are received to the host storage of a data management platform from multiple sources. Typically, the data assets may have some interrelationship but may be stored in different data storage resources. As discussed above, the data assets are received from any number of miscellaneous data asset sources. The data assets may be in various formats and may be received from various organizations, various groups within an organization and from various locations.

At operation 204 the received data assets are analyzed using one or more data management features as discussed above and the data is reformatted into a new data model for management, organization, and classification. The data assets are reformatted based upon a corresponding data model or schema (e.g., graphical data, columnar data, or document-oriented data). The reformatted data assets are saved in a host storage based upon user direction.

At operation 206 the reformatted data is analyzed using one or more data management features and the data management platform dynamically identifies interconnections between the received data assets and generates interconnection data. Such interconnection data may include associations like citations and also structured associations like multi-level hierarchies, among others.

At operation 208, the generated interconnection data is stored in the host storage. The generated interconnection data is stored in an appropriate database or database management system based upon the format of the data generated. The interconnection data may include metadata associated with data asset relationships. Such metadata may include, for example, data source types, attributes, and system flags as well as the links that connect the miscellaneous data assets.

Figure 3:
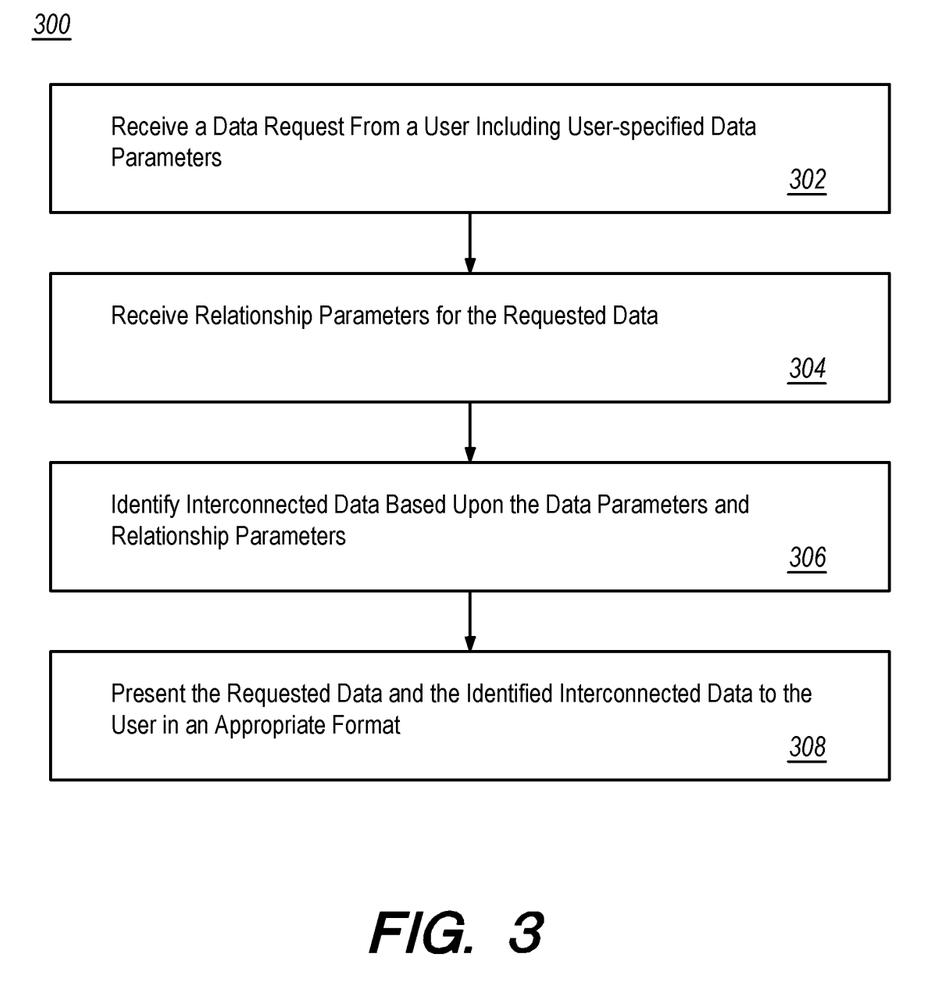
FIG. 3 illustrates a process by which a user requests and accesses data from the data management platform in accordance with an example of the present disclosure.

FIG. 3 illustrates a process by which a user requests and accesses data from the data management platform in accordance with an example of the present disclosure. Process 300, shown in FIG. 3 begins with operation 302 in which a request for data is received from a user at the API gateway. The request specifies data parameters which may include a data domain specifier which may be any logical grouping of data (e.g., product data, customer data, project data, etc.). The data parameters may also include a data type specifier and any type of unique identifier of the data.

At operation 304 the user specifies a relationship parameter for the requested data.

At operation 306, the data management platform identifies interconnected data based upon the specified data parameters and specified relation parameters.

At operation 308, the requested data and interconnected data as identified by the data management platform is presented to the user in an appropriate format. For example, the data management platform provides the capability to capture and manage domain knowledge as a graph schema.

Thus, examples of the present disclosure provide an advance data management and analysis platform that allows the integration of heterogeneous data sets, employs machine learning to effect real-time data discovery, and dynamically associates data assets based on their content to generate data relationships. Examples, of the present disclosure provide requested data and interconnected data to facilitate visualization and analysis of large unstructured datasets.

Methods according to the above-described examples can be implemented using computer-executable instructions that are stored or otherwise available from computer readable media. Such instructions can comprise, for example, instructions and data which cause or otherwise configure a special purpose processing device to perform a certain function or group of functions. The computer executable instructions may be, for example, binaries, intermediate format instructions such as assembly language, firmware, or source code. Examples of computer-readable media that may be used to store instructions, information used, and/or information generated during methods according to described examples include magnetic or optical disks, flash memory, USB devices provided with non-volatile memory, networked storage devices, and so on.

The instructions, media for conveying such instructions, computing resources for executing them, and other structures for supporting such computing resources are means for providing the functions described in these disclosures.

Figure 4:
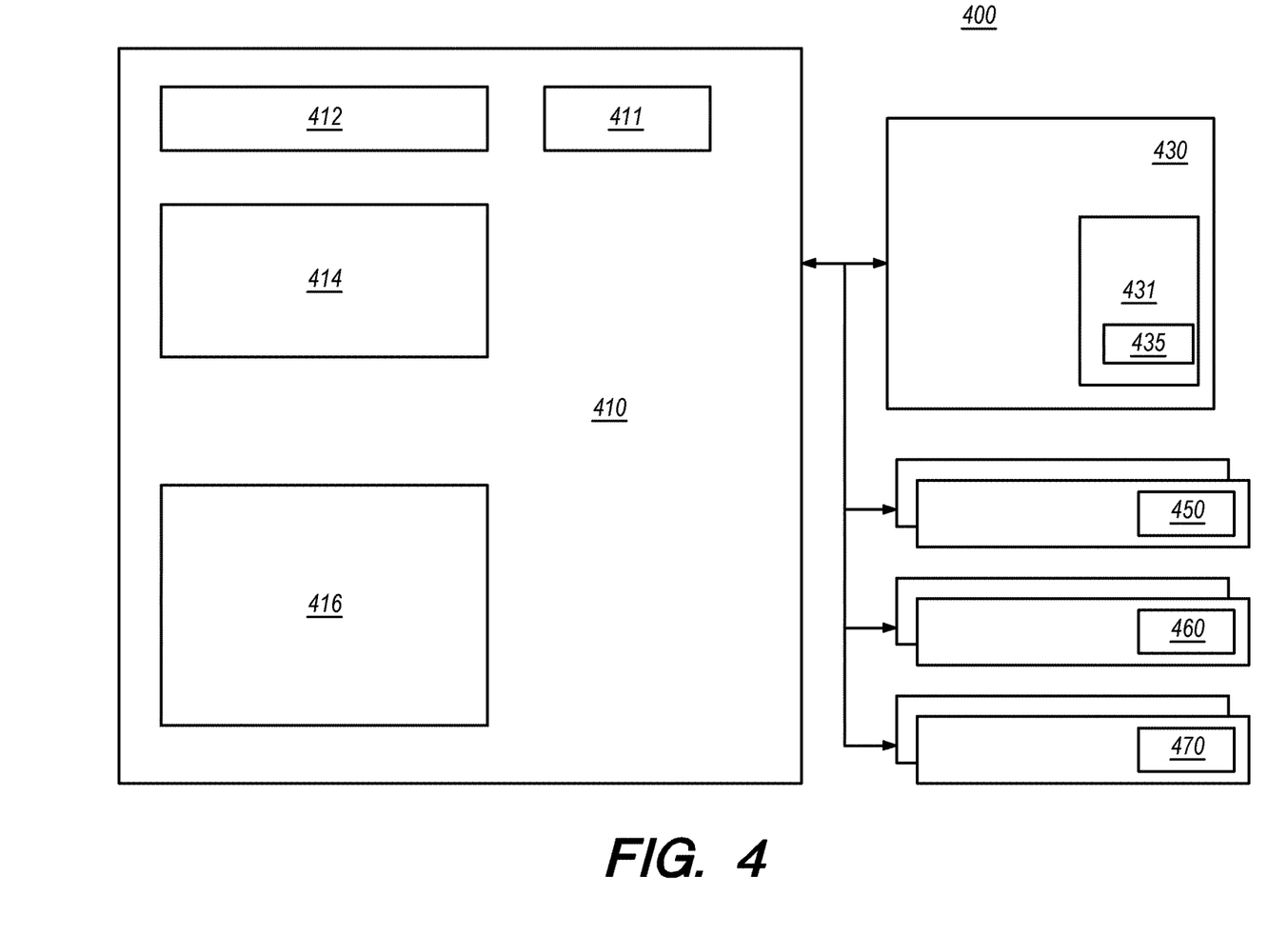
FIG. 4 illustrates a block diagram of a computer system architecture having components suitable for implementing a data management and integration system according to examples of the present disclosure.

FIG. 4 illustrates a block diagram of a special purpose computer system architecture having components suitable for implementing centralized data management examples of the present disclosure, and for use in the environments described herein. System 400, shown in FIG. 4 is suitable for a data management platform that may comprise multiple modules which may be implemented as a microservices architecture with independently deployable processes. System 400 is suitable for a data management platform that provide features that allow for integrating heterogeneous datasets, use machine learning to effect data discovery in real time, dynamically associate data assets based on their content to generate data relationships, and present the data and interconnected data for real-time analysis of unstructured datasets.

In particular, FIG. 4 illustrates one or more computing systems 400 suitable for executing an example of a data management system. System 400 provides a data management platform 410 that provides data management services to remote users through various user access devices, shown for example as user access device 430. System 400 also includes miscellaneous data sources, shown for example as computing node 450, storage nodes 460 and other computing systems 470. In the illustrated example, each computing system 400 has components that include one or more CPU processors 412, various I/O components 411, data storage 416, and memory 414. The I/O components 411 may include a display, a network connection, a computer-readable media drive, and other I/O devices. The various user access devices 430 of the data management system 400 have similar components, including a CPU, I/O components, storage, and memory, shown for example as memory 431. The other computing systems 470, computing nodes 450 and/or storage nodes 460 may also each include similar components to some, or all of the components illustrated with respect to computing system 400, but such components are not illustrated in this example for the sake of brevity. In addition, the computing nodes 450 may be of multiple types in at least some examples, including of multiple resource configuration types, and/or may be available from multiple sources.

An example of the data management platform is executing in memory 414, such as under control of CPU processor(s) 412 as programmed with software instructions of the data management platform, and it interacts with user access devices 430, computing nodes 450 and storage nodes 460, and other computing systems 470 over the network 406 (e.g., via the Internet and/or the World Wide Web, intranet, etc.). In this example, the data management system 400 includes functionality related to data management operations as described above. The data management platform 410 includes functionality related to managing the data from the miscellaneous data sources on behalf of various users, such as, for example, in conjunction with a network-accessible data management platform provided by data management system 400. The computing systems, computing nodes and/or storage nodes as illustrated may be executing various software as part of the data management system. For example, the user interface device 430 may be executing browser 435 or other software in memory 431, such as to request data and specify data parameters and relationship parameters of the requested data. Such operations may effect the retrieval, modification, and/or presentation of data to the user of the data management platform and/or perform various other types of data management actions.

Various information related to the operation of the data management platform may be stored in memory 414. Such information may include transaction data, user data, stored data in various types of data structures, as well as configuration data used to configure the data management platform. As will be appreciated, such information may be stored in other manners. For example, such information may be stored in a distributed storage system (not shown) and provided using various of the computing nodes 450.

Some or all of the systems and/or modules may be implemented or provided in other manners, such as by consisting of one or more means that are implemented at least partially in application-specific integrated circuits (ASICs), standard integrated circuits, controllers (e.g., microcontrollers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory, a network storage device, or a portable media article to be read by an appropriate drive or via an appropriate connection.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A centralized data management system, comprising:
an application program interface (API) gateway to receive, from various data
sources, data assets having multiple formats, and to reformat the data assets based upon a corresponding data model for a data asset;
plural data management modules, each plural data management module being independently deployable, and each plural data management being implemented as a microservice to dynamically identify interconnections between the data assets, the data management modules providing at least two or more of tagging, ownership, relationship, cataloging, discovery, lineage and provenance, and lifecycle;
wherein the API gateway receives a data request, the data request including a set of data parameters that specify data and a set of relationship parameters corresponding to the data request and wherein one or more data management features of a set of data management features is used to identify interconnected data based upon the set of data parameters and the set of relationship parameters, further comprising: a user access device to present the data and the interconnected data to a user; and
a database to store the reformatted data assets and the interconnection data.

2. The centralized data management system of claim 1 wherein the interconnection data is metadata associated with a relationship between data assets.

3. The centralized data management system of claim 2, wherein the metadata includes a data asset link that associates the data assets.

4. The centralized data management system of claim 1 wherein the data assets and the interconnection data are stored in a containerized database.

5. The centralized data management system of claim 1 wherein the data parameters include a data domain specifier and a data type specifier.

6. The centralized data management system of claim 1 wherein the data and the interconnected data are displayable in a format based upon the set of data parameter and the set of relationship parameters.

7. A non-transitory, computer-readable storage medium having stored thereon instructions which when executed by a processor, cause the processor to perform operations comprising: receiving data assets to a data management platform through an application program interface (API) gateway, the data assets having multiple formats; reformatting the data assets based upon a corresponding data model; accessing a set of data management services through a corresponding API, wherein each data management service is associated with its own API to dynamically identify interconnections between the data assets, the set of data management services including at least two or more tagging, ownership, relationship, cataloging, discovery, lineage and provenance, and lifecycle; generating interconnection data for the data assets, wherein the data management services are implemented as microservices, each data management service being independently deployable; and storing the data assets and the interconnection data;

wherein the instructions cause the processor to perform the further operation comprising: receiving a data request to the API gateway, the data request including a set of data parameters that specify data; receiving a set of relationship parameters corresponding to the data request; accessing one or more data management features of the set of data management features based upon the set of data parameters and the set of relationship parameters; identifying interconnected data based upon the specified data parameters and specified relation parameters; and presenting the data and the interconnected data to a user.

8. The non-transitory, computer-readable storage medium of claim 7, wherein the interconnection data is metadata associated with a relationship between data assets.

9. The non-transitory, computer-readable storage medium of claim 8, wherein the metadata includes a data asset link that associates the data assets.

10. The non-transitory, computer-readable storage medium of claim 7, wherein the data assets and the interconnection data are stored in a containerized database.

11. The non-transitory, computer-readable storage medium of claim 10, wherein the containerized database is a distributed graph database.

12. The non-transitory, computer-readable storage medium of claim 10, wherein the containerized database is a distributed columnar database.

13. The non-transitory, computer-readable storage medium of claim 10, wherein the containerized database is a distributed document-oriented database.

14. The non-transitory, computer-readable storage medium of claim 7, wherein the instructions cause the processor to perform the further operation comprising:

receiving a data request to the API gateway, the data request including a set of data parameters that specify data;

receiving a set of relationship parameters corresponding to the data request;

accessing one or more data management features of the set of data management features based upon the set of data parameters and the set of relationship parameters;

identifying interconnected data based upon the specified data parameters and specified relation parameters; and presenting the data and the interconnected data to a user.

15. The non-transitory, computer-readable storage medium of claim 14, wherein the data parameters include a data domain specifier and a data type specifier.

16. The non-transitory, computer-readable storage medium of claim 14, wherein the data and the interconnected data are presented to a user in a format based upon the set of data parameter and the set of relationship parameters.

* * * * *